United States Patent Office 3,471,576
Patented Oct. 7, 1969

3,471,576
PARAFORMALDEHYDE PHENOLIC
COMPOSITIONS
Herbert Klesper, Cologne-Flittard, Fritz Steinfatt,
Opladen, Klaus Langheinrich, Leverkusen, and
Walter Lorenz, Wuppertal-Vohwinkel, Germany,
assignors to Farbenfabriken Bayer Aktiengesellschaft, Leverkusen, Germany, a corporation of
Germany
No Drawing. Filed Nov. 15, 1965, Ser. No. 507,687
Claims priority, application Germany, Nov. 20, 1964,
F 44,484
Int. Cl. C11d 3/48; C07c 39/27
U.S. Cl. 260—619                2 Claims

ABSTRACT OF THE DISCLOSURE

An antimicrobial preparation utilizing as active agent the product obtained by heating a component consisting of a halophenol, resorcinol, halo-resorcinol, alkylated resorcinol,

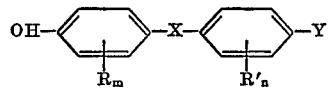

or

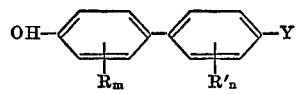

wherein
R and R' are individually members selected from the group consisting of hydrogen, alkyl and halo;
m and n are individually integers of 1–4;
X is a member selected from the group consisting of a methylene, oxygen, imino, sulfur and sulfone moiety;
Y is a member selected from the group consisting of hydrogen, halo, alkyl, hydroxyl and alkoxy;

with paraformaldehyde; effecting the reaction at a temperature of about 90°–150° C. in an organic solvent; and a method for preserving fabrics or dry cleaning fluid by incorporating the active agent.

---

The present invention relates to antimicrobial preparations; more particularly it concerns antimicrobial preparations which are obtained by heating phenolic compounds with paraformaldehyde at 90–150° C. in organic solvents.

The phenolic compounds include, for example, phenol, resorcinol and halogenated and/or alkylated phenols, as well as compounds of the general formula

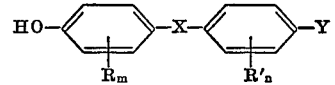

in which R and R', independently of one another, denote hydrogen, alkyl or halogen, m and n stand for integers of 1–4, X denotes a direct bond, methylene, oxygen, an imino group, sulphur or a sulphone group, and Y stands for hydrogen, halogen, alkyl, a hydroxyl or alkoxy group.

Preparations based on the following phenolic compounds are found especially suitable: 2,4-dichlorophenol, 2,4,6 - trichlorophenol, pentachlorophenol, cresol, 3-methyl - 4 - chlorophenol, trichlorocresol, 3 - chloro-2, 4 - dimethylphenol, 2 - ethylphenol, 2,6 - diethylphenol, 3 - methyl - 5 - ethylphenol, 4 - chlororesorcinol, 2-hydroxy - diphenyl, 2,2' - dihydroxy - diphenyl, 4,4'-dihydroxy - diphenyl, 2,5-dihydroxy - 2' - chlorodiphenyl, 2 - hydroxy - 3 - bromo - 5 - chlorodiphenyl, 2,2'-dihydroxy - 5,5' - dichlorodiphenyl - methane, 2,2'-dihydroxy-3,5,6,3',5',6' - hexachlorodiphenyl - methane, 2-methyl-3 - hydroxy - diphenylamine, 2,4,6,2',4',6' - hexachloro-3,3' - dihydroxy - diphenyldisulphide, 4 - hydroxy - diphenyl - sulphone and 4,4' - dihydroxy - diphenylsulphone. Of particular interest are preparations which are produced from phenolic compounds and paraformaldehyde in a ratio of 1 mol phenolic compound to 0.5 to 3 mol formaldehyde in the presence of alkali hydroxide and with the use of water-miscible organic solvents.

Suitable organic solvents include, for example: ethylene glycol, diethylene glycol, propylene glycol, and the monoethers obtained from these glycols and lower monohydric alcohols, such as ethyl alcohol and propyl alcohol.

The antimicrobial preparations of the present invention are especially suitable for disinfectant dry cleaning and for the bacteriostatic finish of textiles. The necessary amounts can easily be determined by preliminary experiments; for dry cleaning an addition of 4 g. of the preparations per litre cleaning liquor will generally be sufficient, while for the bacteriostatic finish of textiles an addition of 3%, referred to the weight of the textiles, is usually adequate. It is noteworthy that the preparations of the present invention are also eminently suitable for the preservation of boring oil emulsions and other emulsions which are prone to attack by microbes.

The following examples serve to illustrate the invention without, however, limiting its scope; the parts given are parts by weight.

EXAMPLE 1

Fabrics of wool, cotton, polyacrylonitrile fibres or synthetic polyamide fibres, which are infected with Stc. aureus, Bct. coli, Bct. proteus, Bct. pyocyaneum and Stc. glycerinaceus, are subjected for 20 minutes to a conventional dry cleaning in a liquor ratio of 1:13 in perchloroethylene or heavy benzine containing, per litre, 5 g. of a commercial cleaning intensifier based on anion-active and non-ionic tensides and 4 g. of one of the antimicrobial preparations described below under (a) to (e). The relative atmospheric humidity in the vapour chamber of the cleaning unit is 75%. The fabrics are subsequently centrifuged and dried. The fabrics then prove to be free from germs.

The antimicrobial preparations concerned are produced in the following manner:

(a) 300 parts pentachlorophenol are dissolved in 580 parts ethylene glycol monopropyl ether with the addition of 70 parts 45% sodium hydroxide solution while warming, 48 parts paraformaldehyde are subsequently added, and the mixture is heated at 115° C. for 15 minutes.

(b) 500 parts 2-hydroxy - diphenyl are dissolved in 456 parts ethylene glycol monoethyl ether while warming, 44 parts paraformaldehyde are subsequently added, and the mixture is heated at 120° C. for 15 minutes.

(c) 200 parts 5,5'-dichloro-2,2'-dihydroxy-diphenyl-methane are dissolved in 689 parts ethylene glycol monopropyl ether with the addition of 44 parts 45% sodium hydroxide solution while warming, 67 parts paraformaldehyde are subsequently added, and the mixture is heated at 110° C. for 15 minutes.

(d) 200 parts 2,3,5,2',3',5'-hexachloro-6,6'-dihydroxy-diphenyl-methane are dissolved in 740 parts ethylene glycol monopropyl ether with the addition of 30 parts 45% sodium hydroxide solution while warming, 30 parts paraformaldehyde are subsequently added, and the mixture is heated at 115° C. for 20 minutes.

(e) 300 parts 4-hydroxy-diphenyl-sulphone are dissolved in 663 parts ethylene glycol monopropyl ether while warming, 37 parts paraformaldehyde are subsequently added, and the mixture is heated at 120° C. for 15 minutes.

When the dry cleaning is not carried out with one of the preparations according to the invention, but instead with an addition of the phenolic compounds on which the preparations are based, in an amount of 4 g./per litre cleaning liquor, the fabrics are not free from germs after cleaning.

EXAMPLE 2

A woolen fabric is treated for 1 hour in an aqueous bath at 100° C. in a liquor ratio of 1:15 with an addition of 3% of the antimicrobial preparation described in Example 1 under (c) and 4% acetic acid (each calculated on the weight of the fabric), and subsequently dried. The fabric then has an excellent bacteriostatic and fungistatic finish.

EXAMPLE 3

2 parts of a commercial boring oil produced from white oil with the addition of olive oil sulphonate and nonylphenol polyglycol ether, are stirred with 98 parts water to give an emulsion, and this is subsequently mixed with 0.2 parts of the antimicrobial preparation described in Example 1 under (a). The emulsion is then excellently preserved, whereas the emulsion produced without an addition of the antimicrobial preparations, exhibits a heavy infection with bacteria already after a few days, when employed in the conventional manner.

We claim:
1. A composition consisting essentially of the reaction products of

(A) 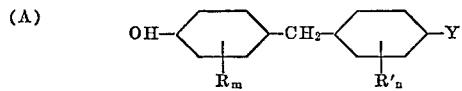

or

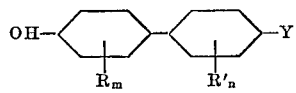

wherein
Y is a hydrogen, chloro, bromo, alkyl of 1–2 carbon atoms, or hydroxy;
R and R' are individually members selected from the group consisting of hydrogen, alkyl of 1–2 carbon atoms, chloro and bromo;
$m$ and $n$ are individually integers of 1–4; with
(B) paraformaldehyde, the molar ratio of (A) to (B) being about 1:.5–3; effecting the reaction at a temperature of about 90–150° C. in an organic solvent.

2. The composition of claim 1 wherein the reaction is effected in a water-miscible organic solvent in the presence of alkali hydroxide.

References Cited

Sen et al., "Journal of the American Chemical Society," vol. 47 (1925), pp. 1084–85.

Hanus, "Journal für praktische Chemie," vol. 158 (1941), pp. 254–265.

Walker, "Formaldehyde," 3rd ed. (1964), pp. 310–315.

CHARLES B. PARKER, Primary Examiner

D. R. PHILLIPS, Assistant Examiner

U.S. Cl. X.R.

424—347, 346, 340, 337, 330, 171, 170, 168; 260—620, 612, 609, 607, 571; 252—106, 8.5; 117—138.5